(12) United States Patent
Hebenstreit et al.

(10) Patent No.: US 9,143,848 B2
(45) Date of Patent: Sep. 22, 2015

(54) ISOLATION OF AUDIO TRANSDUCER

(71) Applicant: Google Inc., Mountain View, CA (US)

(72) Inventors: Joseph John Hebenstreit, San Francisco, CA (US); Mitchell Joseph Heinrich, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/942,152

(22) Filed: Jul. 15, 2013

(65) Prior Publication Data

US 2015/0016638 A1  Jan. 15, 2015

(51) Int. Cl.
*H04R 25/00* (2006.01)
*H04R 1/02* (2006.01)
*H04R 5/033* (2006.01)
*G02C 11/06* (2006.01)
*G02B 27/01* (2006.01)

(52) U.S. Cl.
CPC .............. *H04R 1/028* (2013.01); *H04R 5/0335* (2013.01); *H04R 25/606* (2013.01); *G02B 27/017* (2013.01); *G02C 11/06* (2013.01); *H04R 2460/13* (2013.01)

(58) Field of Classification Search
CPC ............. H04R 2460/13; H04R 5/0335; H04R 1/1075; H04R 25/606; G02C 11/06; G02C 5/001; G02C 5/143; G02B 27/017; G02B 2027/0154
USPC ................. 381/151, 312, 326; 345/8; 248/638
See application file for complete search history.

(56) References Cited

U.S. PATENT DOCUMENTS

| 3,134,861 | A | | 5/1964 | Dempsey et al. |
| 3,787,641 | A | | 1/1974 | Santori |
| 5,054,079 | A | | 10/1991 | Frielingsdorf et al. |
| 5,280,524 | A | | 1/1994 | Norris |
| 5,944,297 | A | * | 8/1999 | Flower et al. ............ 248/638 |
| 8,317,734 | B1 | | 11/2012 | Redfield |
| 2005/0275714 | A1 | | 12/2005 | Ishikawa et al. |
| 2006/0286998 | A1 | | 12/2006 | Fukuda |
| 2011/0187990 | A1 | | 8/2011 | Howell et al. |

(Continued)

FOREIGN PATENT DOCUMENTS

JP  4369976 B2  11/2009

OTHER PUBLICATIONS

International Search Report and Written Opinion for Application No. PCT/US2014/046144 dated Nov. 20, 2014.

*Primary Examiner* — Ahmad F Matar
*Assistant Examiner* — Norman Yu
(74) *Attorney, Agent, or Firm* — Lerner, David, Littenberg, Krumholz & Mentlik, LLP

(57) ABSTRACT

A head-mounted wearable device assembly is provided that includes a bone conduction transducer (BCT) and an elastomeric isolation member that provides acoustic isolation between the BCT and a housing of the head-mounted wearable device assembly. The elastomeric isolation member may be a polyurethane material having a hardness (durometer) on the order of 60 A. The material arrangement and durometer may be chosen to provide a frequency response and/or acoustic leakage within a predetermined range, which results in high quality sound reproduction for the wearer. The elastomeric isolation member may be secured to an interior portion of the housing by a pair of mounting posts. The elastomeric isolation member physically and acoustically separates the BCT from the interior of the housing and other components therein.

18 Claims, 12 Drawing Sheets

(56) References Cited

U.S. PATENT DOCUMENTS

| | | |
|---|---|---|
| 2013/0022220 A1 | 1/2013 | Dong et al. |
| 2013/0089229 A1* | 4/2013 | Kristo et al. .................. 381/326 |
| 2013/0293448 A1* | 11/2013 | Jannard ............................. 345/8 |
| 2014/0064533 A1* | 3/2014 | Kasic, II ....................... 381/329 |

* cited by examiner

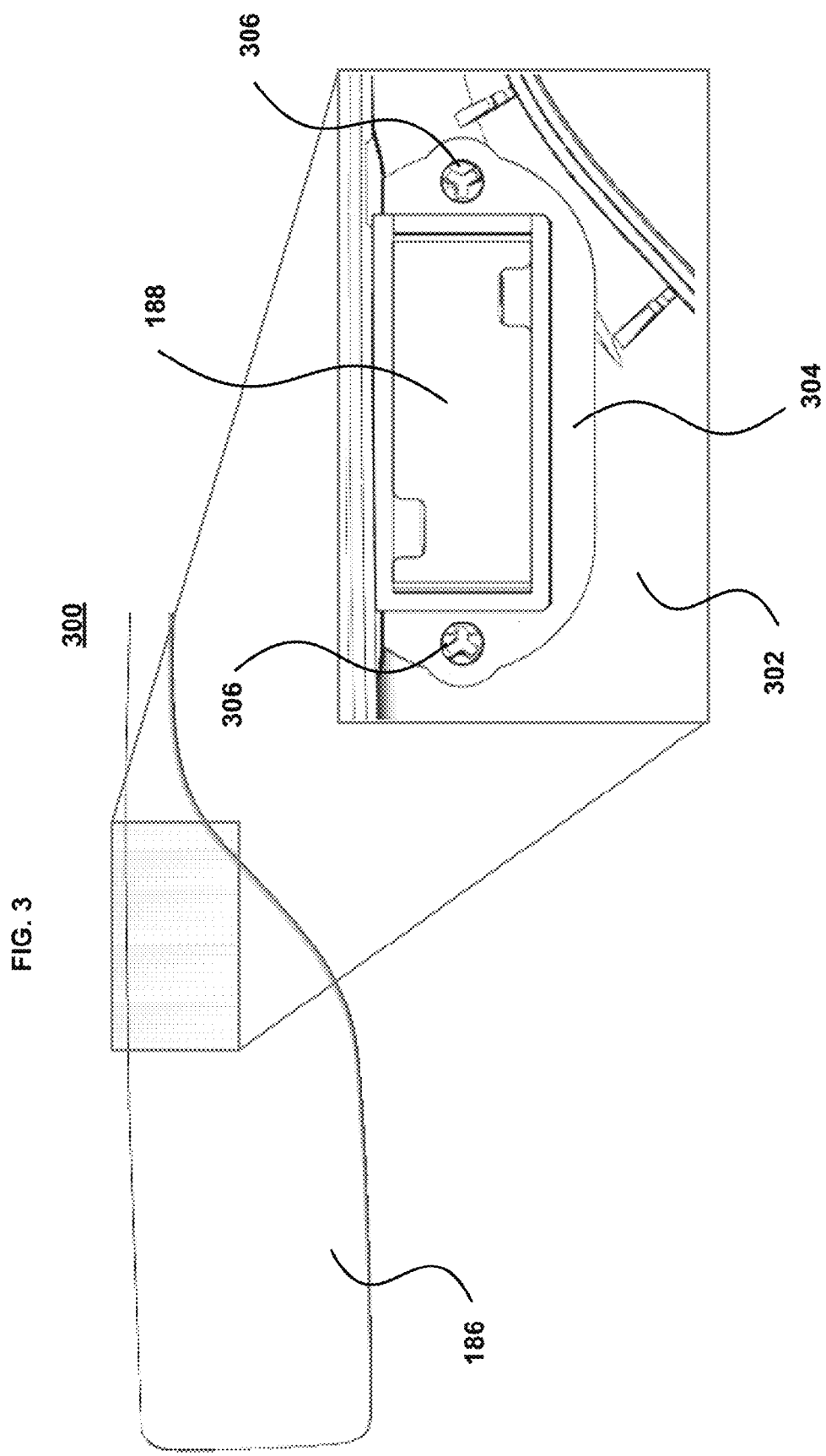

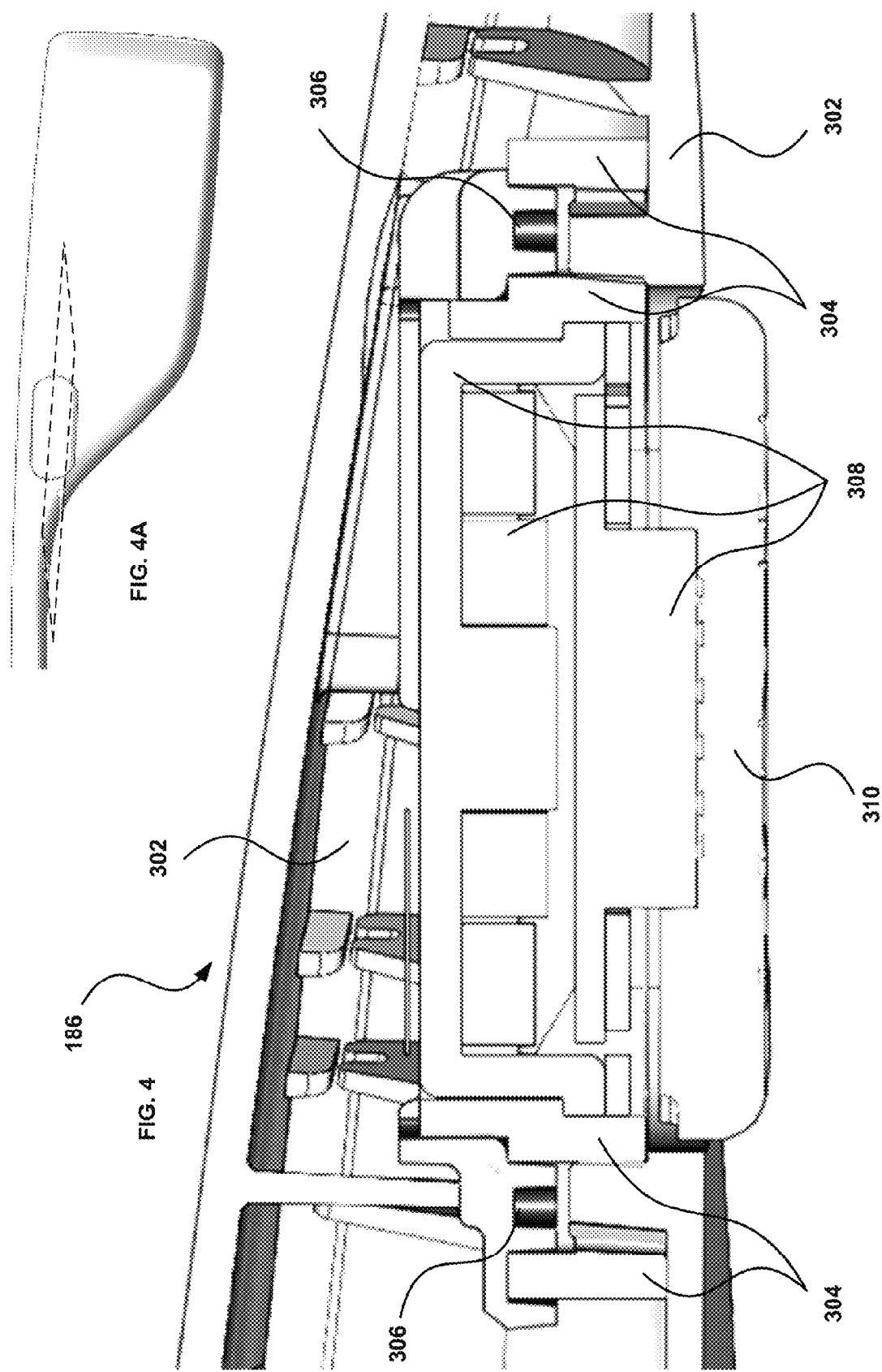

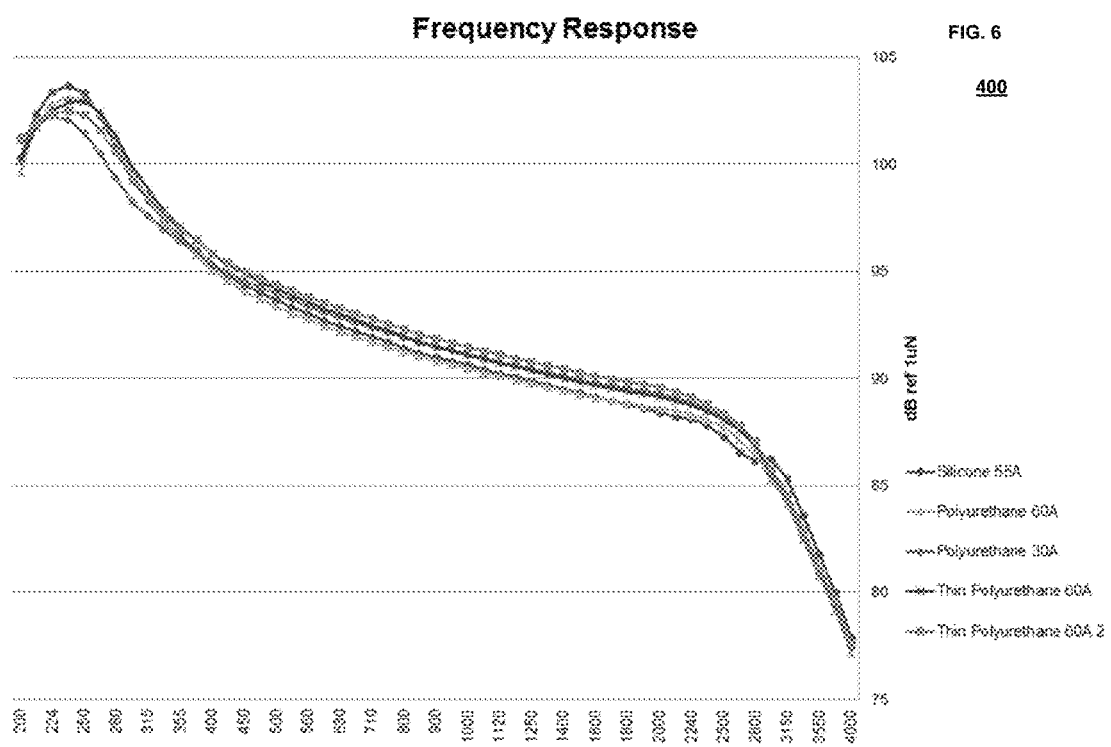

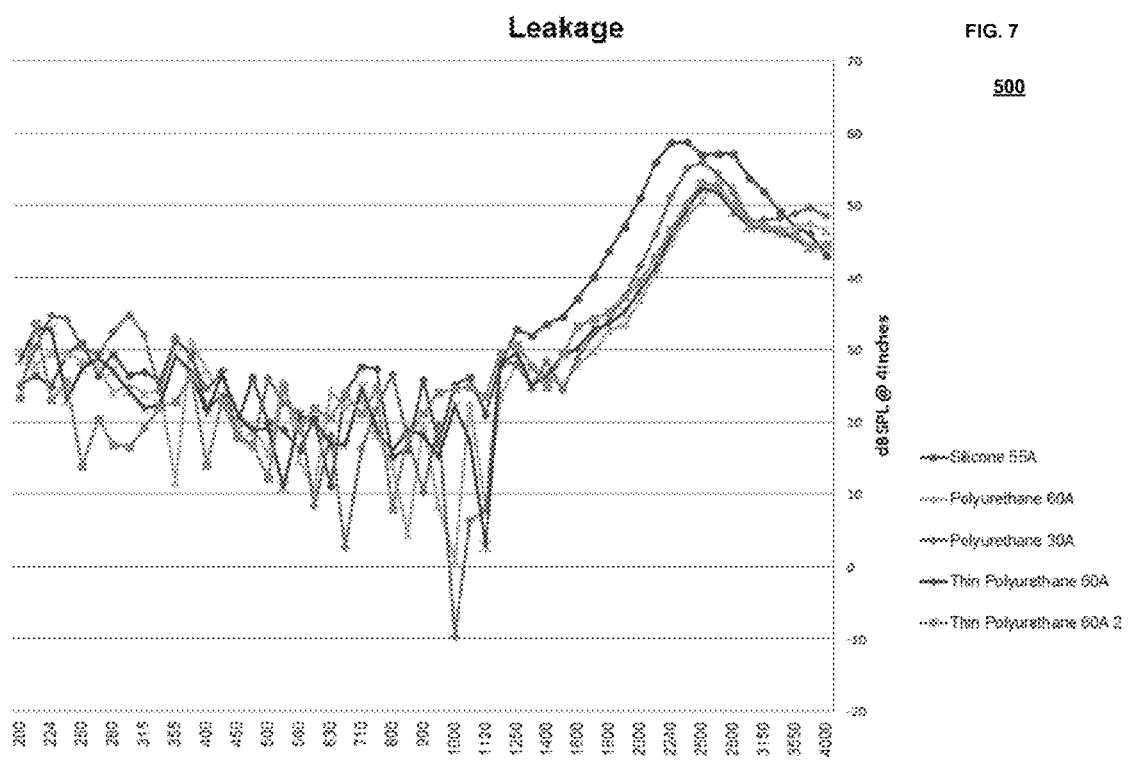

600

ISOLATION OF AUDIO TRANSDUCER

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. Over time, the manner in which these devices are providing information to users is becoming more intelligent, more efficient, more intuitive, and/or less obtrusive. The trend toward miniaturization of computing hardware, peripherals, as well as of sensors, detectors, and image and audio processors, among other technologies, has helped open up a field sometimes referred to as "wearable computing." In the area of image and visual processing and production, in particular, it has become possible to consider wearable displays that place a graphic display close enough to a wearer's (or user's) eye(s) such that the displayed image appears as a normal-sized image, such as might be displayed on a traditional image display device. The relevant technology may be referred to as "near-eye displays."

Wearable computing devices with near-eye displays may also be referred to as "head-mountable displays", "head-mounted displays," "head-mounted devices," or "head-mountable devices." A head-mountable display places a graphic display or displays close to one or both eyes of a wearer. To generate the images on a display, a computer processing system may be used. Such displays may occupy a wearer's entire field of view, or only occupy part of wearer's field of view. Further, head-mounted displays may vary in size, taking a smaller form such as a glasses-style display or a larger form such as a helmet, for example.

BRIEF SUMMARY

An aspect of the present disclosure relates to a wearable device assembly configured to be worn on the head of a user, in which audio information is provided to the user via a bone conduction transducer. An elastomeric isolation member is disposed between the bone conduction transducer and a housing of the wearable device assembly.

In accordance with one aspect of the disclosure, a wearable device assembly is provided. The assembly includes a head retention structure, a bone conduction transducer and an elastomeric isolation member. The head retention structure includes a center support, a first side arm extending from the center frame support on a first side thereof, and a second side arm extending from the center support on a second side thereof. The second side arm includes an auxiliary housing having an interior member. The head retention structure is configured to be worn on the head of a user. The bone conduction transducer is at least partly received within the auxiliary housing. The bone conduction transducer is configured to produce sound and to impart the sound to the user's head. The elastomeric isolation member is disposed between the interior member of the auxiliary housing and the bone conduction transducer. The elastomeric isolation member is configured to provide acoustic isolation of the bone conduction transducer from the auxiliary housing.

In one example, the interior member includes at least one mounting post, and the elastomeric isolation member is secured to and surrounds the at least one mounting post. In another example, the elastomeric isolation member comprises a polyurethane having a durometer on the order of 60 A. In a further example, the bone conduction transducer includes a sound generation device and a contact member. The contact member provides a surface for contacting the user's head and imparting sound to the user from the sound generation device. In this case, the contact member comprises a polycarbonate. In one alternative, the elastomeric isolation member includes a base member and a lip member extending from the base member. The base member is disposed between the sound generation device and the interior member, and the lip member is configured to provide isolation of the contact member from the auxiliary housing.

In another example, a hardness of the elastomeric isolation member is selected to have a predetermined frequency response within a range of frequencies between 200 and 4000 Hz. In yet another example, a hardness of the elastomeric isolation member is selected to have a predetermined acoustic leakage response within a range of frequencies between 200 and 4000 Hz. And in a further example, a first portion of the elastomeric isolation member has a first durometer, and a second portion of the elastomeric member has a second durometer.

According to another example, the interior member includes a pair of mounting posts and the elastomeric isolation member includes a pair of bracket members secured to the pair of mounting posts. Here, the pair of bracket members may each include pre-compressed extension pads.

In accordance with another aspect of the disclosure, a wearable device assembly is provided. The assembly includes a head retention structure, an auxiliary housing, a bone conduction transducer and an elastomeric isolation member. The head retention structure includes a center support, a first side arm extending from the center frame support on a first side thereof, and a second side arm extending from the center support on a second side thereof. The head retention structure is configured to be worn on the head of a user. The auxiliary housing is affixed to one of the first and second side arms and includes a pair of mounting posts therein. The bone conduction transducer is at least partly received within the auxiliary housing, the bone conduction transducer configured to produce sound and to impart the sound to the user's head. The elastomeric isolation member is disposed between the bone conduction transducer and the auxiliary housing. The elastomeric isolation member is secured to the pair of mounting posts, and is configured to provide acoustic isolation of the bone conduction transducer from the auxiliary housing.

In one example, the elastomeric isolation member is selected to exhibit tunable acoustic properties. In another example, the elastomeric isolation member comprises a polymer material having a durometer between 55 A-65 A. In a further example, at least a portion of the elastomeric isolation member is pre-compressed to adjust at least one of frequency response and audio leakage of the assembly.

In yet another example, the elastomeric isolation member includes a pair of bracket members secured to the pair of mounting posts within the auxiliary housing. In this case, both bracket members of the elastomeric isolation member may include a pre-compressed extension pad. Here, the pre-compressed extension pads may have a first durometer, and other portions of the elastomeric member have a second durometer.

In another example, the bone conduction transducer includes a sound generation device and a contact member. The contact member provides a surface for contacting the user's head and imparting sound to the user from the sound generation device. The contact member comprises a polycarbonate. The elastomeric isolation member may include a base member and a lip member extending from the base member. In this case, the base member is disposed between the sound generation device and the pair of mounting posts, and the lip member is configured to provide isolation of the contact member from the auxiliary housing.

And in another example, a hardness of the elastomeric isolation member is selected to have either a predetermined frequency response within a range of frequencies between 200 and 4000 Hz or a predetermined acoustic leakage response within the range of frequencies between 200 and 4000 Hz.

BRIEF DESCRIPTION OF THE DRAWINGS

FIG. 3 illustrates a portion of a bone conduction transducer according to aspects of the disclosure.

FIGS. 4, 4A, 5 and 5A illustrate cross-sectional views of the bone conduction transducer of FIG. 3.

FIG. 6 is a frequency response chart comparing different materials for use in sound isolation, in accordance with aspects of the disclosure.

FIG. 7 is an acoustic leakage chart comparing the materials of FIG. 6, in accordance with aspects of the disclosure.

DETAILED DESCRIPTION

Example methods and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. In the following detailed description, reference is made to the accompanying figures, which form a part thereof. In the figures, similar symbols typically identify similar components, unless context dictates otherwise. Other embodiments may be utilized, and other changes may be made, without departing from the spirit or scope of the subject matter presented herein.

The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

Systems and devices in which example embodiments may be implemented will now be described in greater detail. In general, an example system may be implemented in or may take the form of a wearable computer (also referred to as a wearable computing device). In an example embodiment, a wearable computer takes the form of or includes a head-mountable display ("HMD"), which may also be referred to herein as a "head-mounted device."

An HMD may generally be any display device that is capable of being worn on the head and places a display in front of one or both eyes of the wearer. An HMD may take various forms, such as a helmet or eyeglasses. As such, references to "eyeglasses" or a "glasses-style" HMD should be understood to refer to an HMD that has a glasses-like frame so that it can be worn on the head. Further, example embodiments may be implemented by or in association with an HMD with a single display or with two displays, which may be referred to as a "monocular" HMD or a "binocular" HMD, respectively.

Figure 1A:
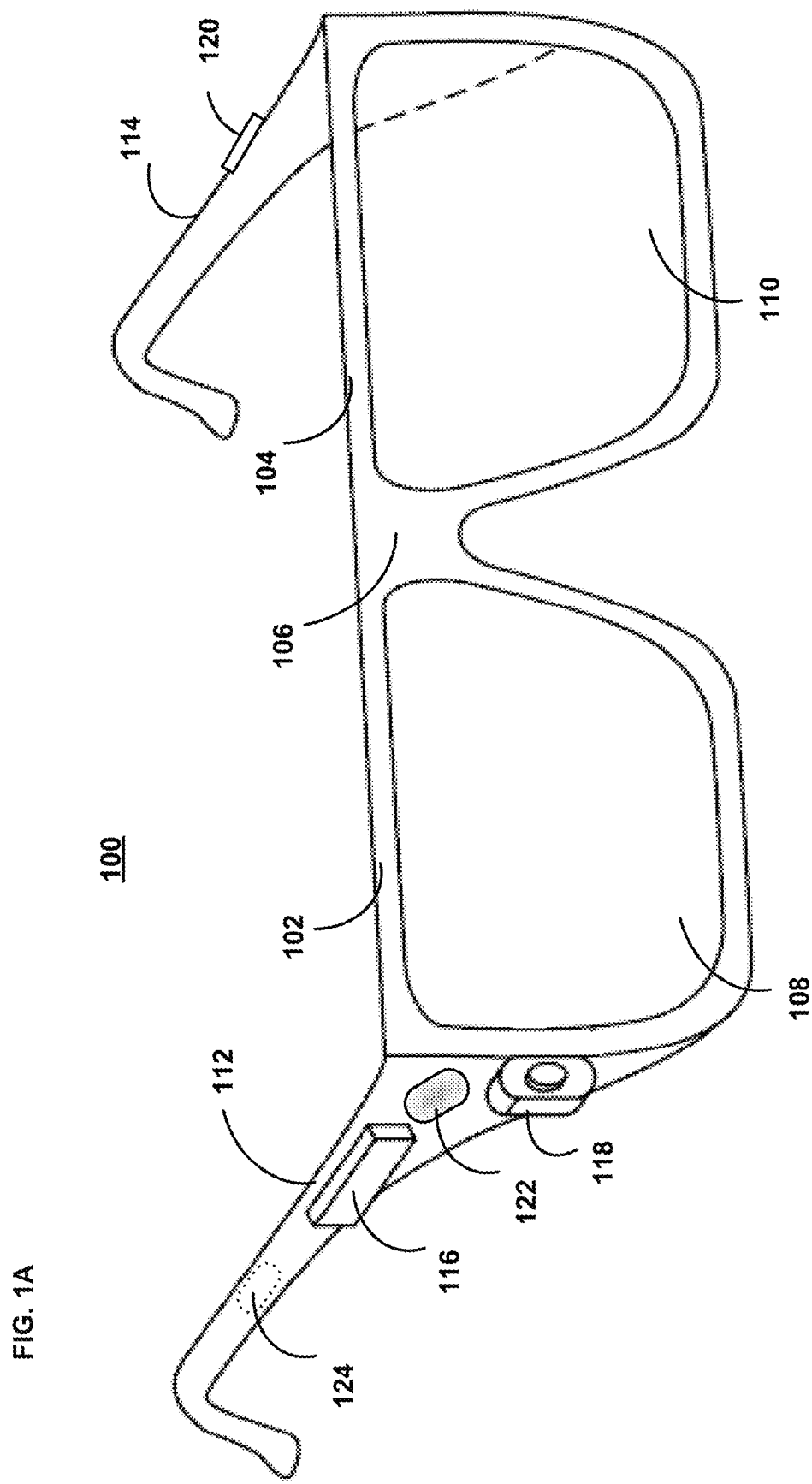
FIGS. 1A-B illustrate a wearable computing system according to an aspect of the disclosure.

FIG. 1A illustrates a wearable computing system according to one aspect of the disclosure. In FIG. 1A, the wearable computing system takes the form of a head-mountable device (HMD) 100. However, example systems and devices may take the form of or be implemented within or in association with other types of devices. As illustrated in FIG. 1A, the HMD 100 includes frame elements including lens frames 102, 104 and a center frame support 106, lens elements 108, 110, and extending side-arms 112, 114. The center frame support 106 and the extending side-arms 112, 114 are configured to secure the HMD 100 to a user's face via a user's nose and ears, respectively.

Each of the frame elements 102, 104, and 106 and the extending side-arms 112, 114 may be formed of a solid structure of plastic and/or metal, or may be formed of a hollow structure of similar material so as to allow wiring and component interconnects to be internally routed through the HMD 100. Other materials may be possible as well.

One or more of each of the lens elements 108, 110 may be formed of any material that can suitably display a projected image or graphic. Each of the lens elements 108, 110 may also be sufficiently transparent to allow a user to see through the lens element. Combining these two features of the lens elements may facilitate an augmented reality or heads-up display where the projected image or graphic is superimposed over a real-world view as perceived by the user through the lens elements.

The extending side-arms 112, 114 may each be projections that extend away from the lens-frames 102, 104, respectively, and may be positioned behind a user's ears to secure the HMD 100 to the user. The extending side-arms 112, 114 may further secure the HMD 100 to the user by extending around a rear portion of the user's head. Additionally or alternatively, for example, the HMD 100 may connect to or be affixed within a head-mounted helmet structure. Other configurations for an HMD are also possible.

The HMD 100 may also include an on-board computing system 116, an image capture device 118, a sensor 120, and a finger-operable touch pad 122. The on-board computing system 116 is shown to be positioned on the extending side-arm 112 of the HMD 100. However, the on-board computing system 116 may be provided on other parts of the HMD 100 or may be positioned remote from the HMD 100 (e.g., the on-board computing system 116 could be wired to or wirelessly connected to the HMD 100). The on-board computing system 116 may include a processor and memory, for example. The on-board computing system 116 may be configured to receive and analyze data from the image capture device 118 and the finger-operable touch pad 122 (and possibly from other sensory devices, user interfaces, or both) and generate images for output by the lens elements 108 and 110.

The image capture device 118 may be, for example, a camera that is configured to capture still images and/or to capture video. In the illustrated configuration, image capture device 118 is positioned on the extending side-arm 112 of the HMD 100. However, the image capture device 118 may be provided on other parts of the HMD 100. The image capture device 118 may be configured to capture images at various resolutions or at different frame rates. Many image capture devices with a small form-factor, such as the cameras used in mobile phones or webcams, for example, may be incorporated into an example of the HMD 100.

Further, although FIG. 1A illustrates one image capture device 118, multiple image capture device may be used, and each may be configured to capture the same view, or to capture different views. For example, the image capture device 118 may be forward facing to capture at least a portion of the real-world view perceived by the user. This forward facing image captured by the image capture device 118 may then be used to generate an augmented reality where computer generated images appear to interact with or overlay the real-world view perceived by the user.

The sensor 120 is shown on the extending side-arm 114 of the HMD 100. However, the sensor 120 may be positioned on other parts of the HMD 100. For illustrative purposes, only one sensor 120 is shown. However, in an example embodiment, the HMD 120 may include multiple sensors. For example, an HMD 100 may include sensors 120 such as one or more gyroscopes, one or more accelerometers, one or more magnetometers, one or more light sensors, one or more infrared sensors, and/or one or more microphones. Other sensing devices may be included in addition or in the alternative to the sensors that are specifically identified herein.

The finger-operable touch pad 122 is shown on the extending side-arm 112 of the HMD 100. However, the finger-operable touch pad 122 may be positioned on other parts of the HMD 100. Also, more than one finger-operable touch pad may be present on the HMD 100. The finger-operable touch pad 122 may be used by a user to input commands. The finger-operable touch pad 122 may sense at least one of a pressure, position and/or a movement of one or more fingers via capacitive sensing, resistance sensing, or a surface acoustic wave process, among other possibilities. The finger-operable touch pad 122 may be capable of sensing movement of one or more fingers simultaneously, in addition to sensing movement in a direction parallel or planar to the pad surface, in a direction normal to the pad surface, or both, and may also be capable of sensing a level of pressure applied to the touch pad surface.

In some embodiments, the finger-operable touch pad 122 may be formed of one or more translucent or transparent insulating layers and one or more translucent or transparent conducting layers. Edges of the finger-operable touch pad 122 may be formed to have a raised, indented, or roughened surface, so as to provide tactile feedback to a user when the user's finger reaches the edge, or other area, of the finger-operable touch pad 122. If more than one finger-operable touch pad is present, each finger-operable touch pad may be operated independently, and may provide a different function.

In a further aspect, HMD 100 may be configured to receive user input in various ways, in addition or in the alternative to user input received via finger-operable touch pad 122. For example, on-board computing system 116 may implement a speech-to-text process and utilize a syntax that maps certain spoken commands to certain actions. In addition, HMD 100 may include one or more microphones via which a wearer's speech may be captured. Configured as such, HMD 100 may be operable to detect spoken commands and carry out various computing functions that correspond to the spoken commands.

As another example, HMD 100 may interpret certain head-movements as user input. For example, when HMD 100 is worn, HMD 102 may use one or more gyroscopes and/or one or more accelerometers to detect head movement. The HMD 100 may then interpret certain head-movements as being user input, such as nodding, or looking up, down, left, or right. An HMD 100 could also pan or scroll through graphics in a display according to movement. Other types of actions may also be mapped to head movement.

As yet another example, HMD 100 may interpret certain gestures (e.g., by a wearer's hand or hands) as user input. For example, HMD 100 may capture hand movements by analyzing image data from image capture device 118, and initiate actions that are defined as corresponding to certain hand movements.

As a further example, HMD 100 may interpret eye movement as user input. In particular, HMD 100 may include one or more inward-facing image capture devices and/or one or more other inward-facing sensors (not shown) that may be used to track eye movements and/or determine the direction of a wearer's gaze. As such, certain eye movements may be mapped to certain actions. For example, certain actions may be defined as corresponding to movement of the eye in a certain direction, a blink, and/or a wink, among other possibilities.

HMD 100 may also include an audio transducer 124 such as a speaker for generating audio output. In one example, the speaker could be in the form of a bone conduction speaker, also referred to as a bone conduction transducer ("BCT"). Audio transducer 124 may be, for example, a vibration transducer or an electroacoustic transducer that produces sound in response to an electrical audio signal input. The frame of HMD 100 may be designed such that when a user wears HMD 100, the audio transducer 124 contacts the wearer. Alternatively, the audio transducer 124 may be embedded within the frame of HMD 100 and positioned such that, when the HMD 100 is worn, it vibrates a portion of the frame that contacts the wearer. In either case, HMD 100 may be configured to send an audio signal to the audio transducer 124, so that vibration of the speaker may be directly or indirectly transferred to the bone structure of the wearer. When the vibrations travel through the bone structure to the bones in the middle ear of the wearer, the wearer can interpret the vibrations provided by the audio transducer (BCT) 124 as sounds.

Various types of bone-conduction transducers (BCTs) may be implemented, depending upon the particular implementation. Generally, any component that is arranged to vibrate the HMD 100 may be incorporated as a vibration transducer. Yet further it should be understood that an HMD 100 may include a single BCT or multiple BCTs. In addition, the location(s) of the BCT(s) on the HMD may vary, depending upon the implementation. For example, a BCT may be located proximate to a wearer's temple, behind the wearer's ear, proximate to the wearer's nose, and/or at any other location where the BCT can vibrate the wearer's bone structure.

Figure 1B:
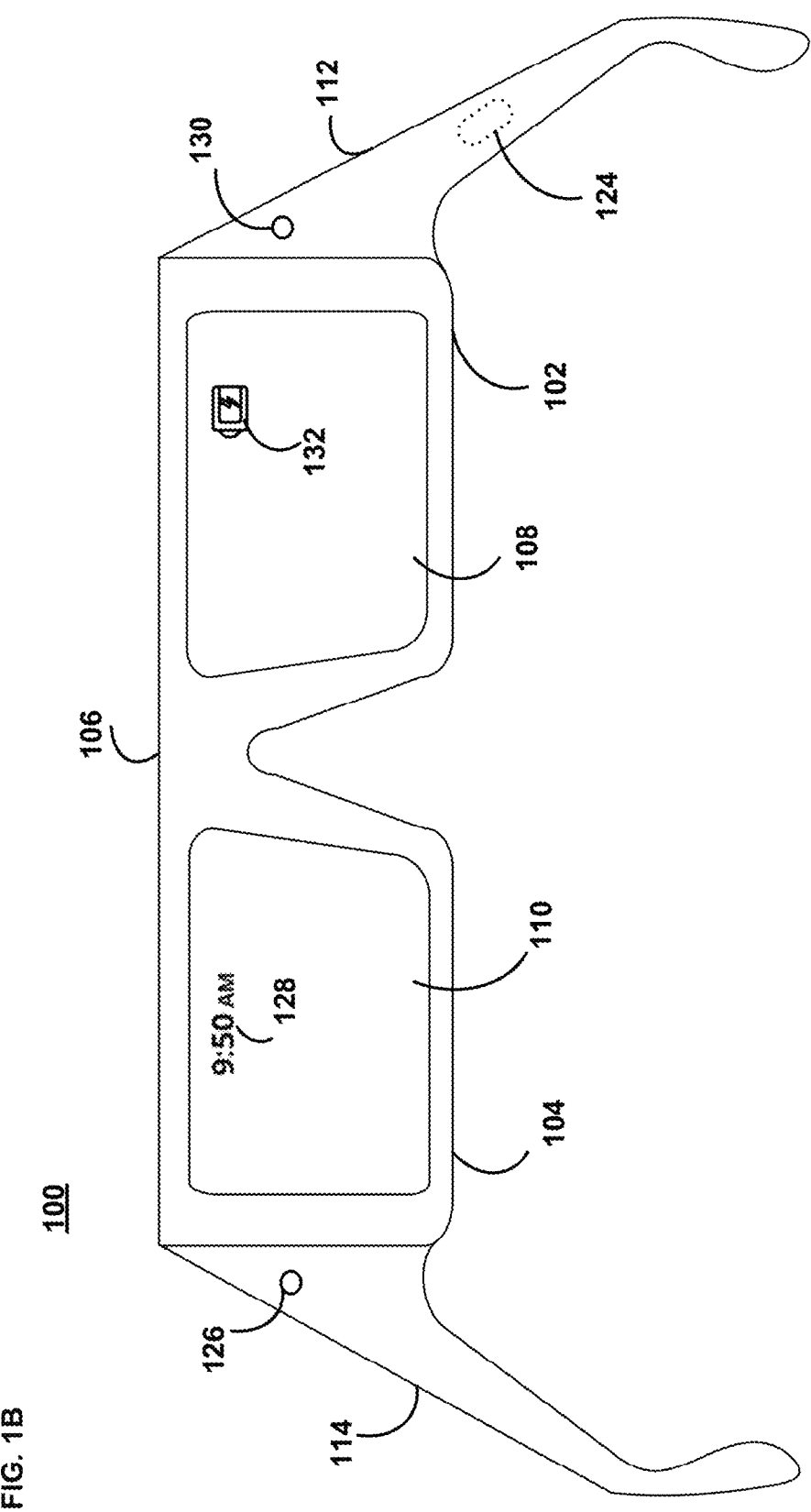

FIG. 1B illustrates an alternate view of the wearable computing device illustrated in FIG. 1A. As shown in FIG. 1B, the lens elements 108, 110 may act as display elements. The HMD 100 may include a first projector 126 coupled to an inside surface of the extending side-arm 114 and configured to project a display 128 onto an inside surface of the lens element 110. Additionally or alternatively, a second projector 130 may be coupled to an inside surface of the extending side-arm 112 and configured to project a display 132 onto an inside surface of the lens element 108.

The lens elements 108, 110 may act as a combiner in a light projection system and may include a coating that reflects the light projected onto them from the projectors 126, 130. In some embodiments, a reflective coating may not be used (e.g., when the projectors 126, 130 are scanning laser devices).

In alternative embodiments, other types of display elements may also be used. For example, the lens elements 108, 110 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 102, 104 for driving such a matrix display. Alternatively or additionally, a laser or LED source and scanning system could be used to draw a raster display directly onto the retina of one or more of the user's eyes. Other possibilities exist as well.

Figure 1C:
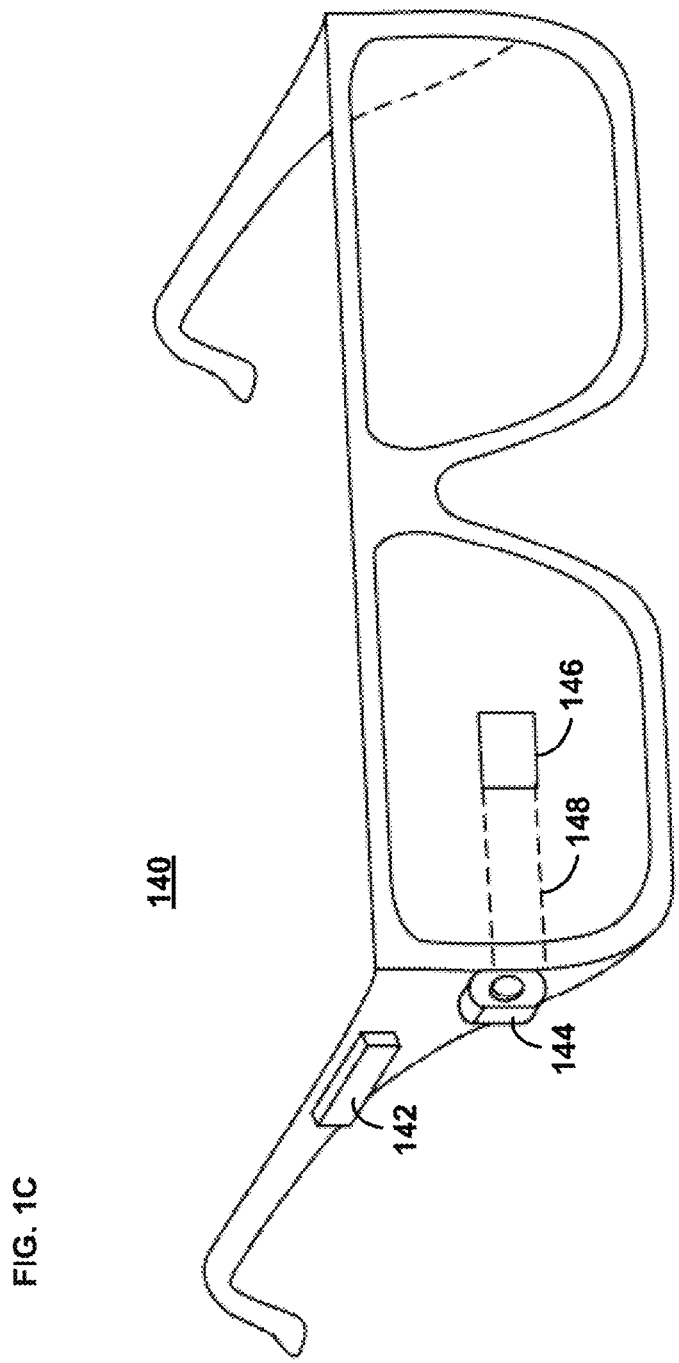
FIG. 1C illustrates another wearable computing system according to an aspect of the disclosure.

FIG. 1C illustrates another wearable computing system according to an example embodiment, which takes the form of an HMD 140. The HMD 140 may include frame elements and side-arms such as those described with respect to FIGS. 1A and 1B. The HMD 140 may additionally include an on-board computing system 142 and an image capture device 144, such as those described with respect to FIGS. 1A and 1B. The image capture device 144 is shown mounted on a frame of the HMD 140. However, the image capture device 144 may be mounted at other positions as well.

As shown in FIG. 1C, the HMD 140 may include a single display 146 which may be coupled to the device. The display 146 may be formed on one of the lens elements of the HMD 140, such as a lens element described with respect to FIGS. 1A and 1B, and may be configured to overlay computer-generated graphics in the user's view of the physical world. The display 146 is shown to be provided in a center of a lens of the HMD 140, however, the display 146 may be provided in other positions, such as for example towards either the upper or lower portions of the wearer's field of view. The display 146 is controllable via the computing system 142 that is coupled to the display 146 via an optical waveguide 148.

Figure 1D:
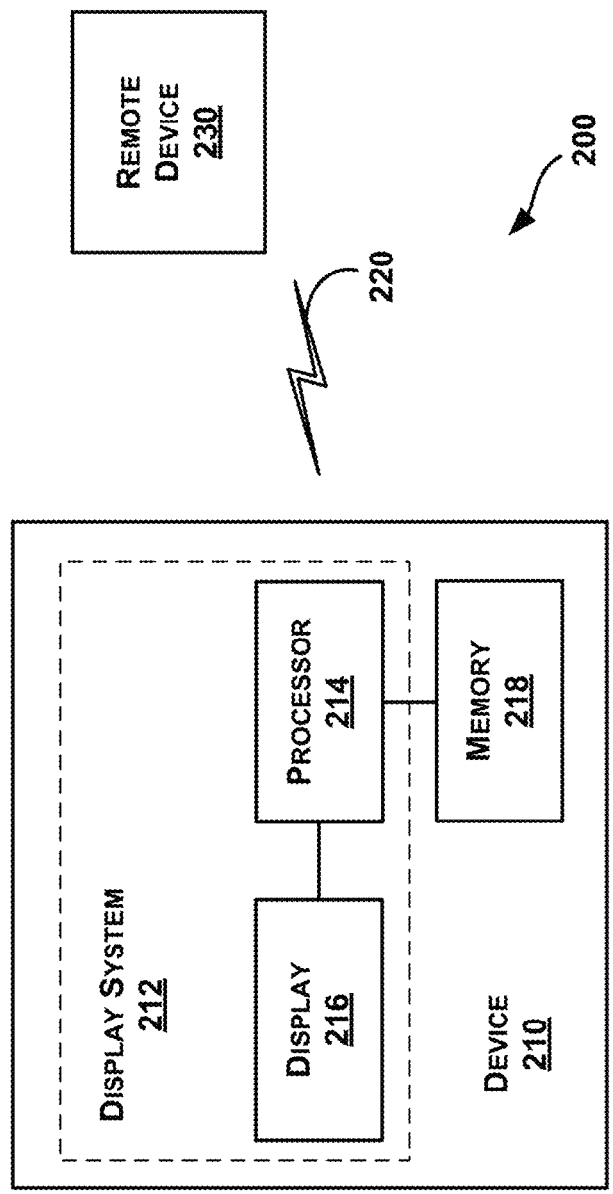
FIG. 1D is a block diagram of an example wearable computing system.

FIG. 1D shows system 200 illustrated within a simplified block diagram a computing device 210 according to an example embodiment. In an example embodiment, computing device 210 communicates using a communication link 220 (e.g., a wired or wireless connection) to a remote device 230. The device 210 may be any type of device that can receive data and display information corresponding to or associated with the data. For example, the device 210 may be a heads-up display system, such as the head-mounted devices 100 or 140 described with reference to FIGS. 1A to 1C.

Thus, the device 210 may include a display system 212 comprising a processor 214 and a display 216. The display 216 may be, for example, an optical see-through display, an optical see-around display, or a video see-through display. The processor 214 may receive data from the remote device 230, and configure the data for display on the display 216. The processor 214 may be any type of processor, such as a micro-processor or a digital signal processor, by way of example only.

The device 210 may further include on-board data storage, such as memory 218 coupled to the processor 214. The memory 218 may store software that can be accessed and executed by the processor 214, for example.

The remote device 230 may be any type of computing device or transmitter including a laptop computer, a mobile telephone, or tablet computing device, etc., that is configured to transmit data to the device 210. The remote device 230 and the device 210 may contain hardware to enable the communication link 220, such as processors, transmitters, receivers, antennas, etc.

Further, remote device 230 may take the form of or be implemented in a computing system that is in communication with and configured to perform functions on behalf of client device, such as computing device 210. Such a remote device 230 may receive data from another computing device 210 (e.g., an HMD 100 or 140), perform certain processing functions on behalf of the device 210, and then send the resulting data back to device 210. This functionality may be referred to as "cloud" computing.

In FIG. 1D, the communication link 220 is illustrated as a wireless connection; however, wired connections may also be used. For example, the communication link 220 may be a wired serial bus such as a universal serial bus or a parallel bus. A wired connection may be a proprietary connection as well. The communication link 220 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. The remote device 230 may be accessible via the Internet and may include a computing cluster associated with a particular web service (e.g., social-networking, photo sharing, address book, etc.).

Figure 2A:
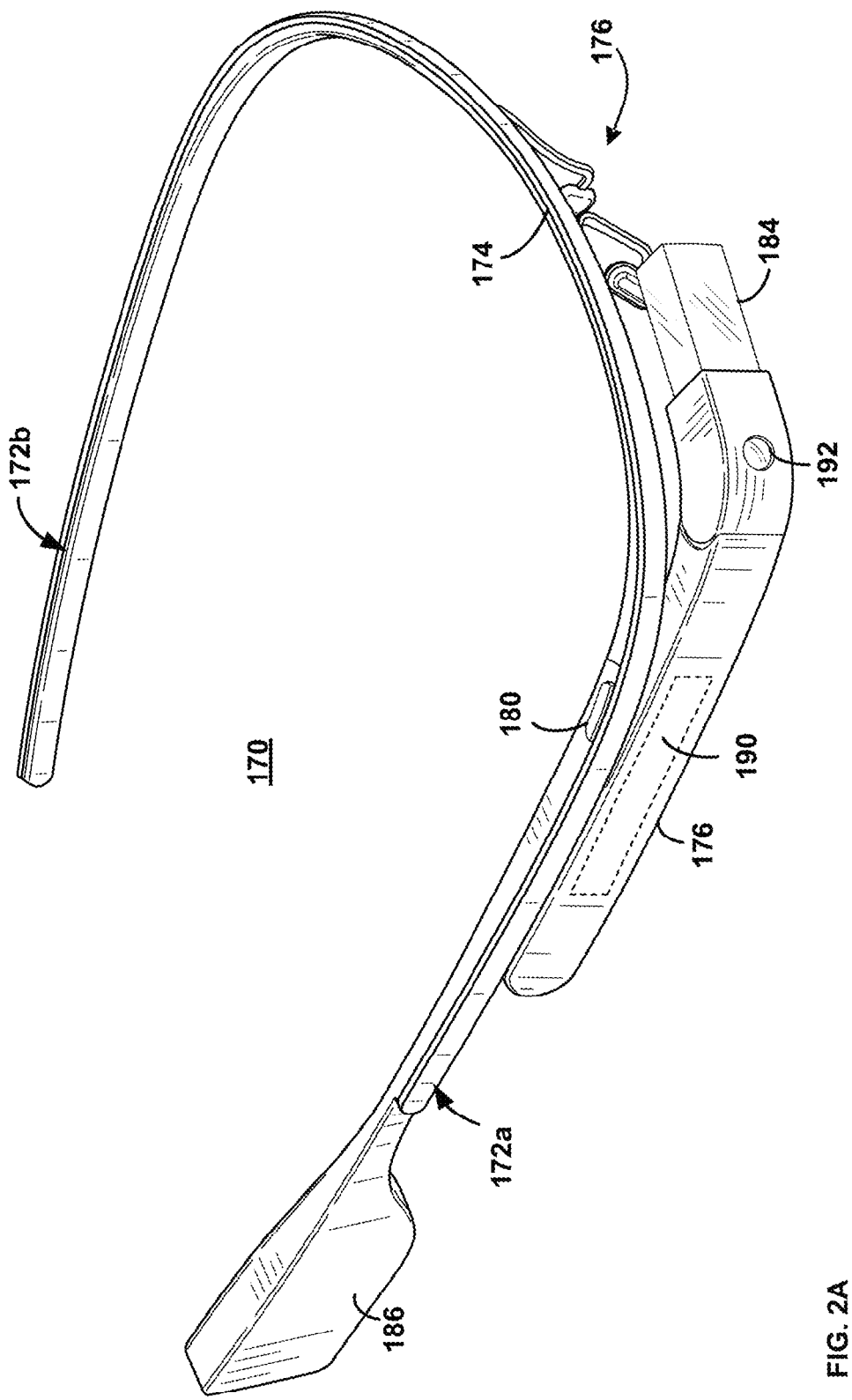
FIGS. 2A and 2B show a wearable computer device according to an embodiment of the disclosure.
Figure 2B:
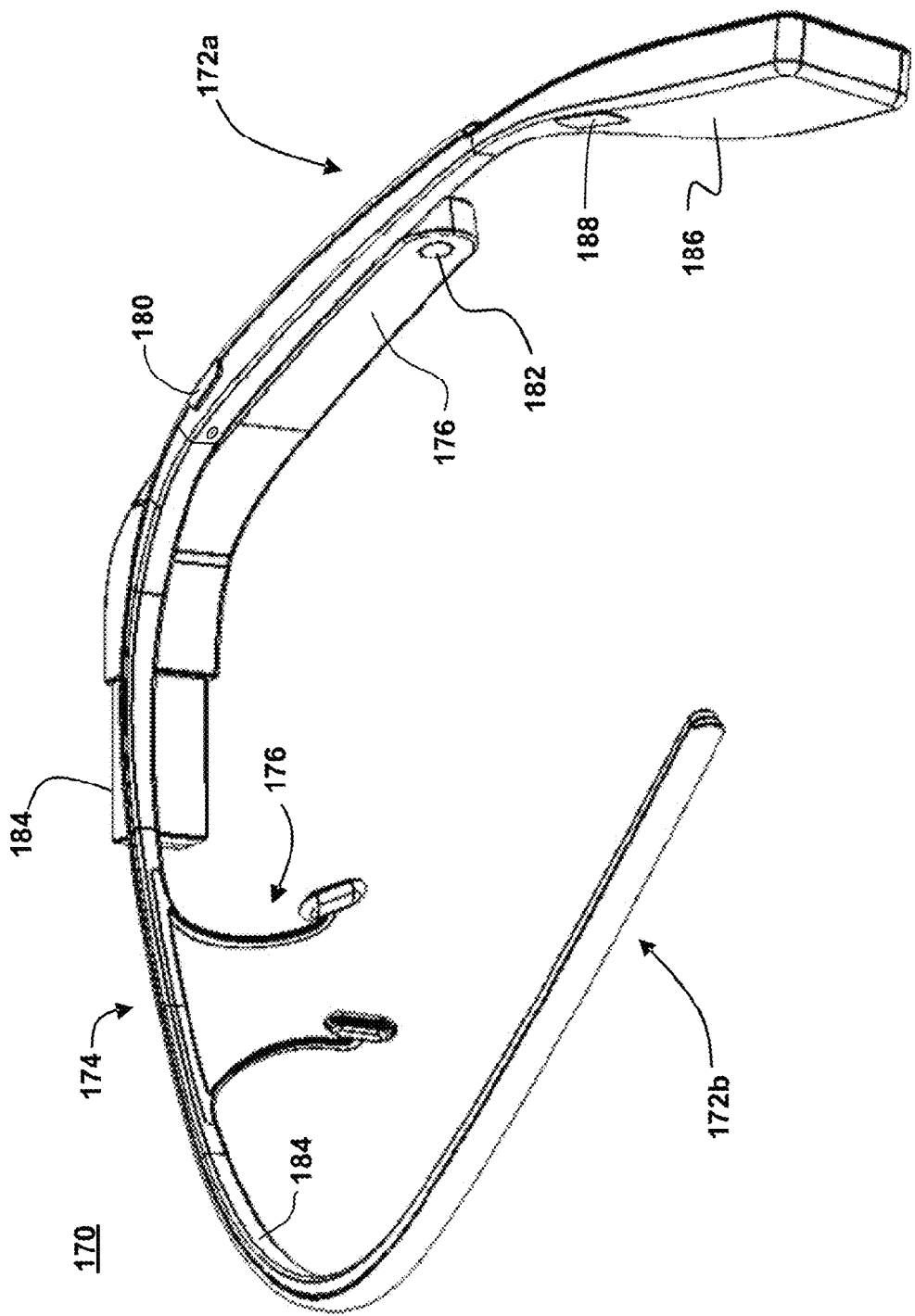

FIGS. 2A and 2B illustrate another example wearable computing system, which takes the form of a monocular HMD 170. The HMD 170 may include side-arms 172a,b, a center frame support 174, and a bridge portion with nosepiece 176. In the example shown in FIG. 2A, the center frame support 174 connects the side-arms 172a,b. The HMD 170 does not include lens-frames containing lens elements. The HMD 170 may additionally include a component housing 176, which may include an on-board computing system (not shown), an image capture device 178, and a button 180 for operating the image capture device 178 (and/or usable for other purposes). Component housing 176 may also include other electrical components and/or may be electrically connected to electrical components at other locations within or on the HMD.

Additionally, component housing 176 can include additional input structures, such as a button 180 (shown in FIG. 2B) that can provide additional functionality for HMD 170, including implementing a lock or sleep feature or allowing a user to toggle the power for HMD 170 between on and off states. The button 180 can further include an LED light beneath a surface thereof that can indicate a status of the device, such as on or off, or asleep or awake. The button can be configured such that the light is visible when on, but that the source of the light cannot be seen when the light is off.

The HMD 170 may include a single display 184, which may be coupled to one of the side-arms 172 via the component housing 176. In an example embodiment, the display 184 may be a see-through display, which is made of glass, plastic and/or another transparent or translucent material, such that the wearer can see their environment through the display 184. Further, the component housing 176 may include the light sources (not shown) for the display 184 and/or optical elements (not shown) to direct light from the light sources to the display 184. As such, display 184 may include optical features that direct light that is generated by such light sources towards the wearer's eye, when HMD 170 is being worn.

As shown in FIGS. 2A and 2B, an end of one of the side arms, e.g., side arm 172a, can be enlarged in the form of an auxiliary housing 186 that can house circuitry and/or a power supply (e.g., removable or rechargeable battery) for HMD 170. In an example, auxiliary housing 186 can be configured and positioned to provide a balancing weight to that of component housing 176. The components within auxiliary housing 186, such as a battery or various control circuitry can be arranged to contribute to a desired weight distribution for HMD 170. HMD 170 also includes a BCT 188 (FIG. 3) positioned on an inner surface of auxiliary housing 186 such that BCT 188 contacts the head of a wearer of HMD 170.

It is also noted that, although the embodiment of FIGS. 2 and 3 shows a component housing 176 that is positioned on side arm 172a such that it is positioned over the right eye of a user when being worn, other similar embodiments are possible in which a mirror-image of component housing 176 can be attached on an opposite side arm 172b to make it positionable over the left eye of the user. Depending on the application of HMD 170 or individual user preferences, it may be desirable to position component housing 176 on a particular side of the user's head. For example, a right-handed person may prefer having the component housing 176 on the right side of her head to make interaction with touch-based input 190 easier. In another example, a person may prefer to have the display 184 over a dominant eye for easier interaction with elements presented on display 184 or over a non-dominant eye to make it easier to shift his focus away from elements presented on display 184 when engaged in other activities. An imaging device 192, as with image capture device 118, may be a camera that is configured to capture still images and/or to capture video.

As illustrated in the example of FIG. 3, a bone conduction transducer may be positioned along an inner surface of the auxiliary housing 186. The quality of the sound provided to the user from the BCT can produce a positive (or negative) experience for the user. High quality sound will enrich the user's experience, while poor quality sound can detract from the experience. One factor that can impact the sound quality is the amount of audio leakage emitted by the BCT.

The BCT necessarily relies on vibration to impart sound to the user. The more this vibration is directed to the user, the better the result. Therefore, it can be important to isolate such vibration from the rest of the components in the HMD. If there is poor isolation, the BCT may behave somewhat like a traditional speaker where the components it is coupled to act as diaphragms to project the sound through the air. Thus, how the BCT is isolated can directly impact the system's sound quality.

Vibration isolation of the BCT includes both (1) proper mechanical design to physically separate the vibrating BCT components from the device enclosure, and (2) selection of an appropriate material to effectively isolate the vibrations. These aspects are further described below.

FIG. 3 illustrates one arrangement 300 for isolating bone conduction transducer 188 in the auxiliary housing 186. As shown, the auxiliary housing 186 includes an interior member 302, such as a sidewall or receptacle. Between the interior member 302 and the BCT 188 is an elastomeric isolation member 304. The elastomeric isolation member 304 provides physical separation between the BCT 188 and the interior member 302. In this example, the elastomeric isolation member 304 connects to the interior member 302 using a pair of mounting posts 306. While two mounting posts 306 are shown, one or more mounting posts may be employed. The number and placement of the mounting posts could have an effect on vibration leakage and audio performance. Less contact, e.g., fewer mounting posts, may be employed to reduce such effects.

FIG. 4 illustrates a cross-sectional view taken along a first plane of the auxiliary housing (as shown by the dashed lines in FIG. 4A). Here, as shown, the elastomeric isolation member 304 surrounds the mounting posts 306 and separates the BCT 188 from the interior member 302. The BCT itself may include different components, including a sound generation (transducer) device 308 and a contact member 310. The sound generation device 308 may have a copper coil or other device arranged to provide vibration/resonance when generating sounds. For instance, one or more coils and magnetic components interact to provide the audio/vibration. Alternatively, a transducer may employ one or more piezoelectric elements to generate the audio/vibration. Other transducer configurations may also be used in accordance with aspects of the disclosure.

The contact member 310 is arranged to provide a surface for contacting the wearer's head, thereby imparting the sound to the user. The contact member 310 may be formed, in one example, of an injection molded plastic, e.g., polycarbonate. The contact member 310 may be held in place against the wearer's head, for instance, by the arrangement of the side arms 172 and the center frame support 174, using the HMD 170 as an example.

Figure 5:
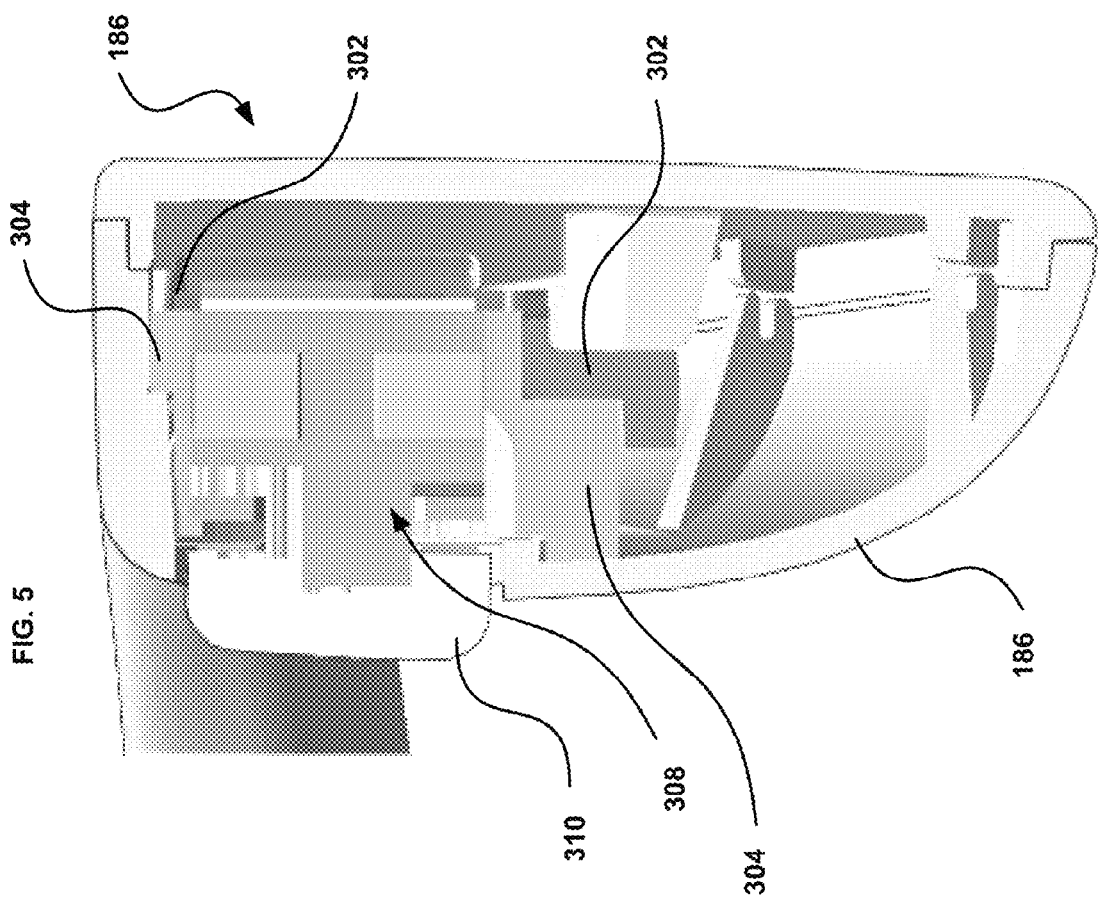
Figure 5A:
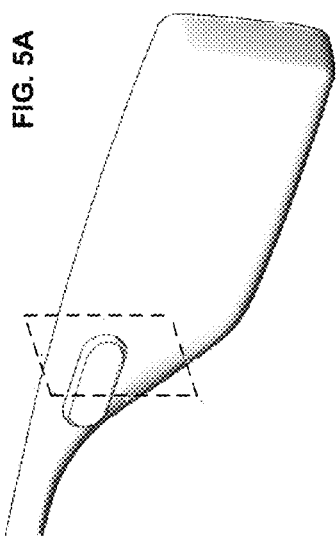

FIG. 5 illustrates a cross-sectional view taken along a second plane of the auxiliary housing (as shown by the dashed lines in FIG. 5A, which is perpendicular to the plane of FIG. 4A). This figure also illustrates how the elastomeric isolation member 304 separates the sound generation device 308 of the BCT 188 from the interior member 302.

As noted above, selection of a suitable material is another aspect of the vibration isolation of the BCT 188. In one instance, the elastomeric isolation member 304 may comprise polyurethane or silicone. The hardness (durometer) of the elastomeric isolation member 304 is desirably chosen such that the member 304 has a preferred or optimal frequency response. The flatter the frequency response across a preselected range of frequencies, the better the resultant sound quality perceived by the user.

FIG. 6 is a frequency response chart 400 showing different materials that could be employed in the elastomeric isolation member 304. The materials include a silicone material having a hardness (durometer) of 55 A (on the Shore A scale), a polyurethane of 60 A, a polyurethane of 30 A, and a thin polyurethane of 60 A. As shown, the "Polyurethane 60 A" material exhibits a suitable frequency response in the charted ranges of 200-4000 Hz, although the other materials may also be employed.

FIG. 7 is an acoustic leakage chart 500 that plots the sound pressure level when the transducer is excited using a swept sin wave that ramps from 200 Hz to 4000 Hz. The results are shown at a sound pressure level ("SPL") measured at 4 inches from the source. As shown, the "Polyurethane 60 A" material provides a suitable leakage response across the range, although the other materials may also be employed. Polyurethane, which has chemical properties that allow for an adjustable amount of polymer cross-linking, may exhibit tunable acoustic properties, which may be well-suited to provide enhanced acoustic isolation for the BCT.

Figure 8:
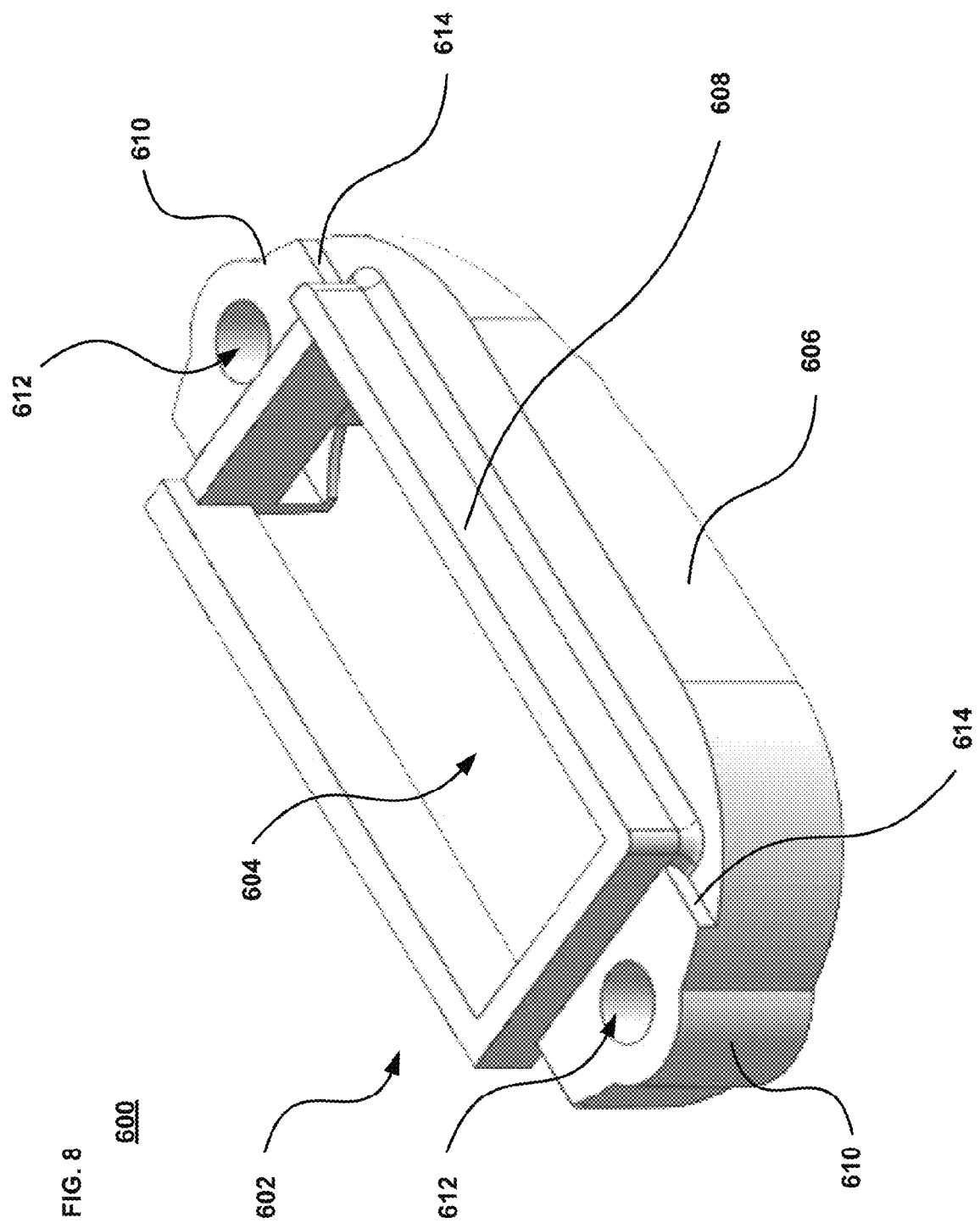
FIG. 8 illustrates an elastomeric isolation member in accordance with aspects of the disclosure.

FIG. 8 illustrates one example configuration 600 for the elastomeric isolation member. As shown, this configuration 600 includes a housing 602 adapted to receive and isolate the BCT (not shown) from the head-mounted device (not shown) via a central receptacle 604. The housing 602 may include a base member 606 and a lip member or flange 608. The base member 606 may couple to or directly contact the interior member of the head-mounted device. And the lip member 608 may help isolate the contact member of the BCT. The housing 602 may also include bracket members 610 having receptacles 612 therethrough, which are adapted to receive the mounting posts (e.g., mounting posts 306 of FIG. 3).

In one alternative, the housing 602 is formed of polyurethane having a durometer on the order of 60 A, e.g., between 55 A-65 A or within 10% of 60 A. In another alternative, the housing 602 may have portions thereof with different durometers. For instance, the base member 606 and the lip member 608 could have different durometers. This may be accomplished by different polyurethanes in different parts of the housing 602, or by different materials (or groups of materials) in different parts of the housing.

In yet another alternative, the bracket members 610 may include extension pads 614. The extension pads 614 may provide for enhanced vibration isolation. In one instance, the extension pads 614 may be pre-compressed to adjust frequency response and audio leakage characteristics.

Although the description herein has been made with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present disclosure as defined by the appended claims.

The invention claimed is:

1. A wearable device assembly, comprising:
a head retention structure including a center support, a first side arm extending from the center frame support on a first side thereof, and a second side arm extending from the center support on a second side thereof, the second side arm including an auxiliary housing having an interior member, the head retention structure configured to be worn on the head of a user;
a bone conduction transducer at least partly received within the auxiliary housing, the bone conduction transducer configured to produce sound and to impart the sound to the user's head; and
an elastomeric isolation member disposed between the interior member of the auxiliary housing and the bone conduction transducer, the elastomeric isolation member being configured to provide acoustic isolation of the bone conduction transducer from the auxiliary housing;
wherein the elastomeric isolation member includes a base member and a lip member extending from the base member, the base member being disposed between the sound generation device and the interior member, and the lip member being configured to provide isolation of the contact member from the auxiliary housing.

2. The wearable device assembly of claim 1, wherein the interior member includes at least one mounting post, and the elastomeric isolation member is secured to and surrounds the at least one mounting post.

3. The wearable device assembly of claim 1, wherein the elastomeric isolation member comprises a polyurethane having a durometer on the order of 60 A.

4. The wearable device assembly of claim 1, wherein the bone conduction transducer includes a sound generation device and a contact member, the contact member providing a surface for contacting the user's head and imparting sound to the user from the sound generation device, the contact member comprising a polycarbonate.

5. The wearable device assembly of claim 1, wherein a hardness of the elastomeric isolation member is selected to have a predetermined frequency response within a range of frequencies between 200 and 4000 Hz.

6. The wearable device assembly of claim 1, wherein a hardness of the elastomeric isolation member is selected to have a predetermined acoustic leakage response within a range of frequencies between 200 and 4000 Hz.

7. The wearable device assembly of claim 1, wherein a first portion of the elastomeric isolation member has a first durometer, and a second portion of the elastomeric member has a second durometer.

8. The wearable device assembly of claim 1, wherein:
the interior member includes a pair of mounting posts; and
the elastomeric isolation member includes a pair of bracket members secured to the pair of mounting posts.

9. The wearable device assembly of claim 8, wherein the pair of bracket members each include pre-compressed extension pads.

10. A wearable device assembly, comprising:
a head retention structure including a center support, a first side arm extending from the center frame support on a first side thereof, and a second side arm extending from the center support on a second side thereof, the head retention structure configured to be worn on the head of a user;
an auxiliary housing affixed to one of the first and second side arms, the auxiliary housing including a pair of mounting posts therein;
a bone conduction transducer at least partly received within the auxiliary housing, the bone conduction transducer configured to produce sound and to impart the sound to the user's head; and
an elastomeric isolation member disposed between the bone conduction transducer and the auxiliary housing, the elastomeric isolation member being secured to the pair of mounting posts, and the elastomeric isolation member being configured to provide acoustic isolation of the bone conduction transducer from the auxiliary housing;
wherein the elastomeric isolation member includes a base member and a lip member extending from the base member, the base member being disposed between the sound generation device and the pair of mounting posts, and the lip member being configured to provide isolation of the contact member from the auxiliary housing.

11. The assembly of claim 10, wherein the elastomeric isolation member is selected to exhibit tunable acoustic properties.

12. The assembly of claim 10, wherein the elastomeric isolation member comprises a polymer material having a durometer between 55 A-65 A.

13. The assembly of claim 10, wherein at least a portion of the elastomeric isolation member is pre-compressed to adjust at least one of frequency response and audio leakage of the assembly.

14. The wearable device assembly of claim 10, wherein the elastomeric isolation member includes a pair of bracket members secured to the pair of mounting posts within the auxiliary housing.

15. The wearable device assembly of claim 14, wherein both bracket members of the elastomeric isolation member include a pre-compressed extension pad.

16. The wearable device assembly of claim 15, wherein the pre-compressed extension pads have a first durometer, and other portions of the elastomeric member have a second durometer.

17. The wearable device assembly of claim 10, wherein the bone conduction transducer includes a sound generation device and a contact member, the contact member providing a surface for contacting the user's head and imparting sound to the user from the sound generation device, the contact member comprising a polycarbonate.

18. The wearable device assembly of claim 10, wherein a hardness of the elastomeric isolation member is selected to have either a predetermined frequency response within a range of frequencies between 200 and 4000 Hz or a predetermined acoustic leakage response within the range of frequencies between 200 and 4000 Hz.

* * * * *